(No Model.) 2 Sheets—Sheet 1.

J. RAABE & W. H. FISHER.
CARTRIDGE SHELL HOLDER.

No. 330,513. Patented Nov. 17, 1885.

WITNESSES:
O. M. Hill
Jno. W. Strehli

INVENTORS
Julius Raabe
and Wm. Hubbell Fisher
per Wm. Hubbell Fisher,
ATTORNEY (No Model.) 2 Sheets—Sheet 2.

J. RAABE & W. H. FISHER.
CARTRIDGE SHELL HOLDER.

No. 330,513. Patented Nov. 17, 1885.

WITNESSES:
O. M. Hill
Jno. W. Strehli

INVENTORS
Julius Raabe
and Wm. Hubbell Fisher,
per Wm. Hubbell Fisher,
ATTORNEY

UNITED STATES PATENT OFFICE.

JULIUS RAABE AND WILLIAM HUBBELL FISHER, OF CINCINNATI, OHIO; SAID JULIUS RAABE ASSIGNOR TO SAID WILLIAM HUBBELL FISHER.

CARTRIDGE-SHELL HOLDER.

SPECIFICATION forming part of Letters Patent No. 330,513, dated November 17, 1885.

Application filed March 23, 1885. Serial No. 159,750. (No model.)

*To all whom it may concern:*

Be it known that we, JULIUS RAABE and WILLIAM HUBBELL FISHER, both residents of Cincinnati, Hamilton county, Ohio, have invented certain new and useful Improvements in Cartridge-Shell Holders, (Loaders,) of which the following is a specification.

The several features of our invention and the various advantages arising from their use, conjointly or otherwise, will be apparent from the following description and claims.

Figure 5:
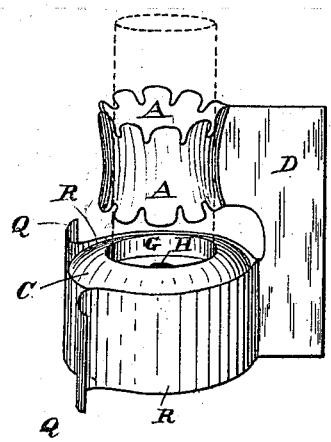
Figure 2:
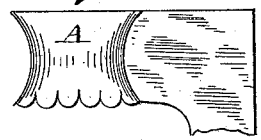
Figure 1:
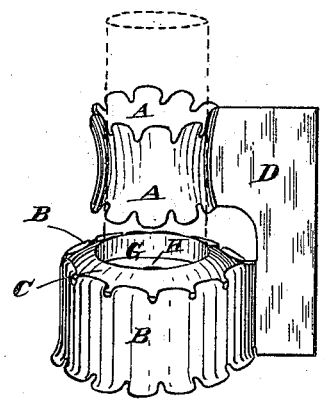
Figure 3:
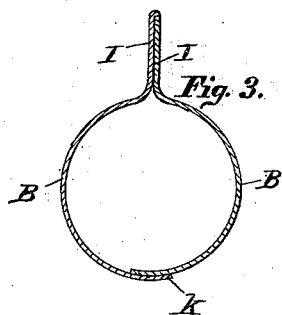
Figure 4:
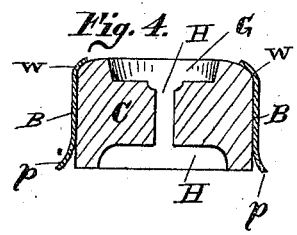
Figure 6:
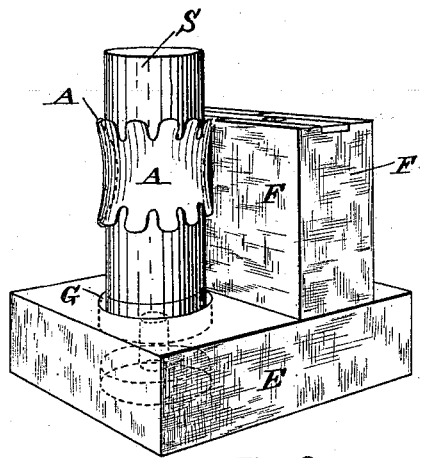
Figure 8:
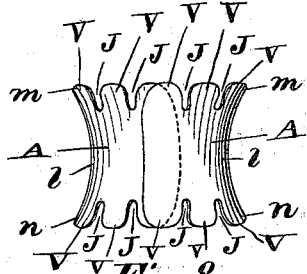
Figure 9:
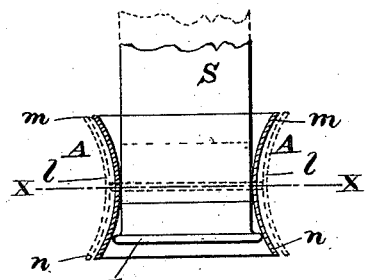
Figure 7:
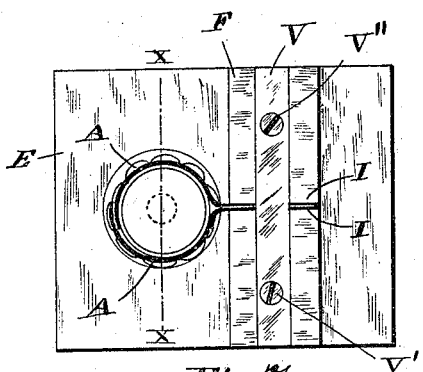

In the accompanying drawings, Figure 1, central figure, Sheet 1, shows in perspective a cartridge-shell holder illustrating the several features of our invention. Fig. 2 shows in elevation a thimble common to all cartridge-holders of this class. Fig. 3, Sheet 1, is a vertical central section taken from side to side of the basal spring-socket or arms shown in Fig. 1, and also of a wooden seating-block held within and by said basal spring-socket, and present in said basal spring-socket in Figs. 1 and 2. Fig. 4, Sheet 1, is a horizontal central section of the basal spring-socket shown in Figs. 1 and 2. Fig. 5, Sheet 1, shows in perspective a cartridge-shell holder in which the upper spring clasp or arms shown in Fig. 1 is retained, the holder being provided with a basal spring socket or arms of another description, a seating-block being shown in the embrace of said basal socket. Fig. 6, Sheet 2, represents in perspective a cartridge-shell holder whose base and upright are made thick and provided with upper spring-arms of the same description as the upper spring-arms shown in Fig. 1. Fig. 7, Sheet 2, is a top view of the holder shown in Fig. 6, except that those portions of the upper spring-arms, which are above the dotted line X X of Fig. 9 are removed, the better to show the relation of the said upper opposing clasping-arms. Fig. 8, Sheet 2, is a side elevation of said upper elastic arms shown in Figs. 1, 5, 6, and 7, and showing the lap of the free end of one arm over the other arm, this mode of constructing them—viz., with an overlap—being the preferred one. Fig. 9, Sheet 2, is a vertical central section of the upper arms mentioned in the description of Fig. 8, said section being taken at the dotted line X X of Fig. 7, and illustrating one part of the mode of withdrawal of a cartridge-shell.

The upper spring holder or clasp consists of two spring curved arms, A A, constituting a thimble flared at the bottom, and preferably also flared at the top. The upper edge of each arm A is flared upward and outward, and the lower edge of each arm A is flared downward and outward. The flare of the upper portion of the arms A is indicated by the letter $m$, and the flare of the lower portion of the arms A is indicated by the letter $n$. The elasticity of each spring-arm is rendered more uniform throughout the entire length of the spring-arm, and the stiffening effect consequent upon forming the upper flare, $m$, and lower flare, $n$, upon the said arm is counteracted by means of slits J J, approximately vertical, cut or otherwise formed in the upper and lower edges of the arm. These slits are therefore preferably present. For the purpose of smoothing the sharp corners of the portions V between the slits, and also for the purpose of ornamentation, the portions V are preferably, in connection with the slits J, formed into scallops, as shown.

The free end of one arm A need not meet the free end of the other arm A; but it is better that these ends should not only meet, but should overlap, as shown at $k$. When thus overlapping, the shell, after being introduced between the arms A A, cannot, by being accidentally pressed toward the free ends, push apart these free ends and, passing out from between them, fall down. Thus the overlapping arms A A will serve as a secure annular clasp, extending entirely around the shell and preventing any lateral movement of the latter in any direction. In using the clasp or holder formed of these arms A A, the cartridge-shell is placed in a vertical potion base downward, directly over the upper opening of the holder. The base of the shell is now inserted into said upper mouth, and the shell is forced downward. The base of the shell, guided by the flare $m$, and aided by said flare, pushes the spring-arms in a direction away from each other, and temporarily enlarging the center of the holder, moves through the holder and is carried down until the base of the shell rests upon the surface of the ground or table upon which it is placed, or rests (as is more usually the case) upon a suitable base connected to and forming a constituent part of the holder. The elastic arms A A close upon the shell, and the holder now securely holds the said shell, particularly the upper portion, secure from lateral overthrow. When the shell is to be withdrawn from the holder, it is vertically raised, and the base of the shell entering the opening formed by the lower flare, n, and aided by said flare, presses apart the arms and passes up through and out of the holder. Were it not for the lower flare, n, the basal flange T of the shell, which flange extends beyond the peripheral surface of the remainder of the shell, would prevent the shell from being drawn up out of the holder. Even in cases where the flange T is absent from the shell, the smooth exterior is less liable to abrasion and is better preserved where the lower flare n is present on the holder.

The holder A A may be secured to any suitable support. Thus in Figs. 6 and 7 it is secured to a rigid wooden upright, F, in turn rigidly connected to a wooden base, E, containing a recess, G, to receive the base of the shell, the recess being preferably provided with the usual central aperture, to prevent the percussion-cap of the shell from coming into contact with the wooden base, and also serving as a place of escape for the cap in the operation of decapping shells.

In Fig. 5 the spring-clasp A A is shown combined with a lower or basal pair of spring-arms, R R, each provided with a lip, Q Q, and embracing a seating-block, C. This seating-block C is of a well-known form, and is provided with central opening, H, and, preferably, also with aperture H′, as shown in Fig. 4. The block is introduced into the embrace of the spring-arms R R, and is withdrawn therefrom by passing it between the separated ends R R and the lips Q Q.

In Fig. 6 the spring clasp or holder A A is shown in combination with a basal socket composed of spring-arms B B, embracing the seating-block C. The lower portion of each of these arms B B is flared downward and outward, this flare being indicated by the letter p. The free end of one arm B need not meet the free end of the other arm B; but they preferably overlap each other at k, as shown, and thus more effectually prevent the seating-block C from escaping laterally from their grasp. The seating-block is inserted into the socket formed by the spring-arms B B by inserting its upper end or face into the lower portion of the space within the arms. The holder is now pressed down or the seating-block pressed upward, and the latter, aided by the flare n, presses apart the arms B B and comes to place within them, and there remains tightly grasped by them until intentionally forced down and out from between them by human agency. After introducing the seating-block between the arms B B, in pressing it to place the block might be pressed too far upward. To guard against such displacement, we provide at the upper edge of the socket a stop, preferably such a one as shown, and which is as follows: The upper edge of each arm is flared or bent inward, this bend or flare being designated by the letter W. When the seating-block is pressed up between the arms B B, it impinges against this bend or flare W, and is thereby prevented from passing too far upward. The upper and lower edges of the arms B B are preferably provided with slits J and portions V, and these are also preferably scalloped, for the same reasons that the edges of the arms A A of the upper spring-holder have the slits J and portions V and are scalloped. The basal spring-socket B B and its seating-block may be used with any suitable description of upper holder.

In Fig. 7 the spring-socket B B and block C are combined with an upper spring-holder composed of the laterally-yielding arms Y Y, each provided with a lip, Z. The vertical shell being moved laterally and introduced between these lips presses apart the yielding arms, and allows the shell to enter sidewise between them. The shell in being removed from the holder is passed laterally out between the lips; but the basal socket is preferably employed with the spring clasp or holder A A. The arms A A and the arms B B are preferably made of spring metal, but may be made of hard rubber or other suitable elastic material.

The spring clasp or holder A A is suitably connected to its support. The preferred description of connection is shown, and consists in connecting the rear end of each spring-arm to a thin plate of metal, I I. (See Fig. 7.) When the spring-arms A A and their plates I I are all formed out of a single metal blank, the plates I I will be united at their rear edges, as at that place will usually occur the fold when the arms A A and plates I I are brought into position.

The spring-socket B B is connected in any suitable manner to rest of the cartridge-shell holder. The preferred description of connection is by plates I I, united at their rear edges, the spring-socket B B and plates I I being formed out of one piece of metal.

Where the means of connecting the upper spring-holder, A A, with the basal spring-socket B B is a thin vertical support, as D, located at the rear of said holder and socket, plates I I of the holder A A and plates I I of the socket B B may be integral, and thus the whole cartridge-shell holder, consisting of the arms A A, arms B B, and their respective plates I I, and their connections, may be formed out of a single piece of metal. Similarly, the shell-holding devices shown in Fig. 5 may respectively be made of one piece of metal.

While the various features of our invention are preferably employed together, one or more of said features may be used without the remainder. In so far as applicable, one or more of said features may be used in connection with cartridge-shell holders or cartridge-shell holding devices other than those herein specifically set forth.

What we claim as new and of our invention, and desire to secure by Letters Patent, is—

1. In a cartridge-holder, the combination, with an upright supporting-standard, of a horizontally-projecting thimble composed of two spring-arms flared outwardly at their extreme lower edges, substantially as described.

2. In a cartridge-holder, the combination, with an upright supporting-standard, of a horizontally-projecting thimble composed of spring-arms flared at the bottom and overlapping at their ends, as set forth.

3. The combination, with the upright standard of a cartridge-holder, of a horizontally-projecting thimble composed of spring-arms perpendicularly slotted near their edges and the portions between the slots flared, substantially as described.

4. The combination, in a cartridge-holder, of an upright standard, composed of a thin plate, and two spring-thimbles extending horizontally from one edge of said plate, one above the other, the lower edge of each spring-thimble being flared outwardly, as set forth.

5. In a cartridge-holder, the combination, with an upright standard composed of thin plate, of an upper thimble composed of spring-arms flared outwardly at the bottom and a lower thimble or socket flared outwardly at the bottom and bent inward at the top, substantially as described.

6. In a cartridge-holder, the combination, with an upright standard, of a horizontally-projecting upper thimble composed of spring-arms flared outwardly at bottom, a lower thimble or socket turned in at top, and a loading-block inclosed in said lower thimble or socket, as set forth.

JULIUS RAABE.
WILLIAM HUBBELL FISHER.

Witnesses:
JNO. W. STREHLI,
O. M. HILL.